United States Patent [19]
DeGrazia et al.

[11] Patent Number: 5,940,488
[45] Date of Patent: Aug. 17, 1999

[54] TELECOMMUNICATION MANAGEMENT SYSTEM AND USER INTERFACE

[75] Inventors: Brad R. DeGrazia, Seattle; Phillip A. Escobar, North Bend, both of Wash.

[73] Assignee: Active Voice Corporation, Seattle, Wash.

[21] Appl. No.: 08/749,656

[22] Filed: Nov. 15, 1996

[51] Int. Cl.$^6$ .............................. H04M 3/42; H04M 1/64
[52] U.S. Cl. ........................ 379/201; 379/202; 379/212; 379/93.23
[58] Field of Search ..................................... 379/201, 202, 379/203, 207, 204, 93.17, 210, 211, 93.19, 93.23, 212, 213, 214, 215, 93.21; 370/260, 259

[56] References Cited

U.S. PATENT DOCUMENTS

| | | | |
|---|---|---|---|
| 4,897,866 | 1/1990 | Majmudar et al. | 379/93.19 |
| 4,953,159 | 8/1990 | Hayden et al. | 379/204 |
| 5,533,110 | 7/1996 | Pinard et al. | 379/202 |
| 5,631,954 | 5/1997 | Evans et al. | 379/202 |
| 5,642,410 | 6/1997 | Walsh et al. | 379/211 |
| 5,754,636 | 5/1998 | Bayless et al. | 379/142 |

OTHER PUBLICATIONS

Advertisement for Visual Voice from Stylus Innovation Inc., Cambridge, MA.
Advertisement for CallXpress3 Desktop for Windows from Applied Voice Technology, Kirkland, WA.
Review of CallXpress 3 from Applied Voice Technology, Kirkland, WA; "Applied Voice Technology's E–Mail Access Keeps You Totally in Touch", *Computer Telephony*, Dec. 1995.
Review of Sixth Sense software by Answersoft, Plano, TX; "Answersoft's Sixth Sense Is Always Watching", *Computer Telephony*, Dec. 1995.
Review of CallXpress3 by Applied Voice Technology, Kirkland, WA; *Computer Telephony*, Mar. 1996.
Review of PhoneLine system from CCOM Information Systems, Iselin, NJ; "Get A Line On CCOM's Phoneline", *Computer Telephony*, Dec. 1995.
Advertisement for VP Express from Telephone Response Technologies, Roseville, CA.
Advertisement for voice mail integration software from BBS Telecom & Mediatrends, Inc.
Advertisement for PhoneLine system from CCOM Information Systems, Iselin, NJ.
Review of CyberPhone by Prometheus Products, Tualatin, OR; "Prometheus' Cyberphone—A Super SOHO System", *Computer Telephony*, Dec. 1995.
Review of Phonetastic Pro by SoftTalk, Needham, MA; "Phonetastic Pro From SoftTalk—Best Multi–Port SOHO TAPI App", *Computer Telephony*, Dec. 1995.

(List continued on next page.)

*Primary Examiner*—Harry S. Hong
*Assistant Examiner*—Benny Q. Tieu
*Attorney, Agent, or Firm*—Graybeal Jackson Haley LLP

[57] ABSTRACT

A method and a device for the management of a TAPI or TSAPI based telecommunications system through the use of a graphical user interface. The invention displays incoming and outgoing calls as icons which are graphically manipulated to control the functions of the system. Dialing, transferring, and conferencing telephone calls, as well as other functions, is accomplished by the manipulation of icons and windows on a computer display.

38 Claims, 8 Drawing Sheets

OTHER PUBLICATIONS

Review of Visual Voice of TAPI from Stylus Innovations, Cambridge, MA; "Stylus Innovation TAPI Bonanza", *Computer Telephony*, Dec. 1995.

Review of VORAMS from Malibu Software Group, Malibu, CA; "Malibu's Unified Messaging and CT Processing Software—", *Computer Telephony*, Dec. 1995.

Review of V.34 OfficeF/X by Spectrum Signal Processing, Burnaby, BC, Canada; "Spectrum's Very Powerful SOHO System", *Computer Telephony*, Dec. 1995.

Review of Phonetastic system by SoftTalk, Needham, MA; "SoftTalk's Groupware Now Siemens/Rolm Ready", *Computer Telephony*, Dec. 1995.

Review of CallXpress3 from Applied Voice Technology, Kirkland, WA; "If You Publish An API . . . , CT Integration Will Come", *Computer Telephony*, Mar. 1996.

Advertisement for NETphone from Claflin & Clayton, Inc., Northboro, MA.

Advertisement for Voice Systems Research, Rocklin, CA and London, England; 1996.

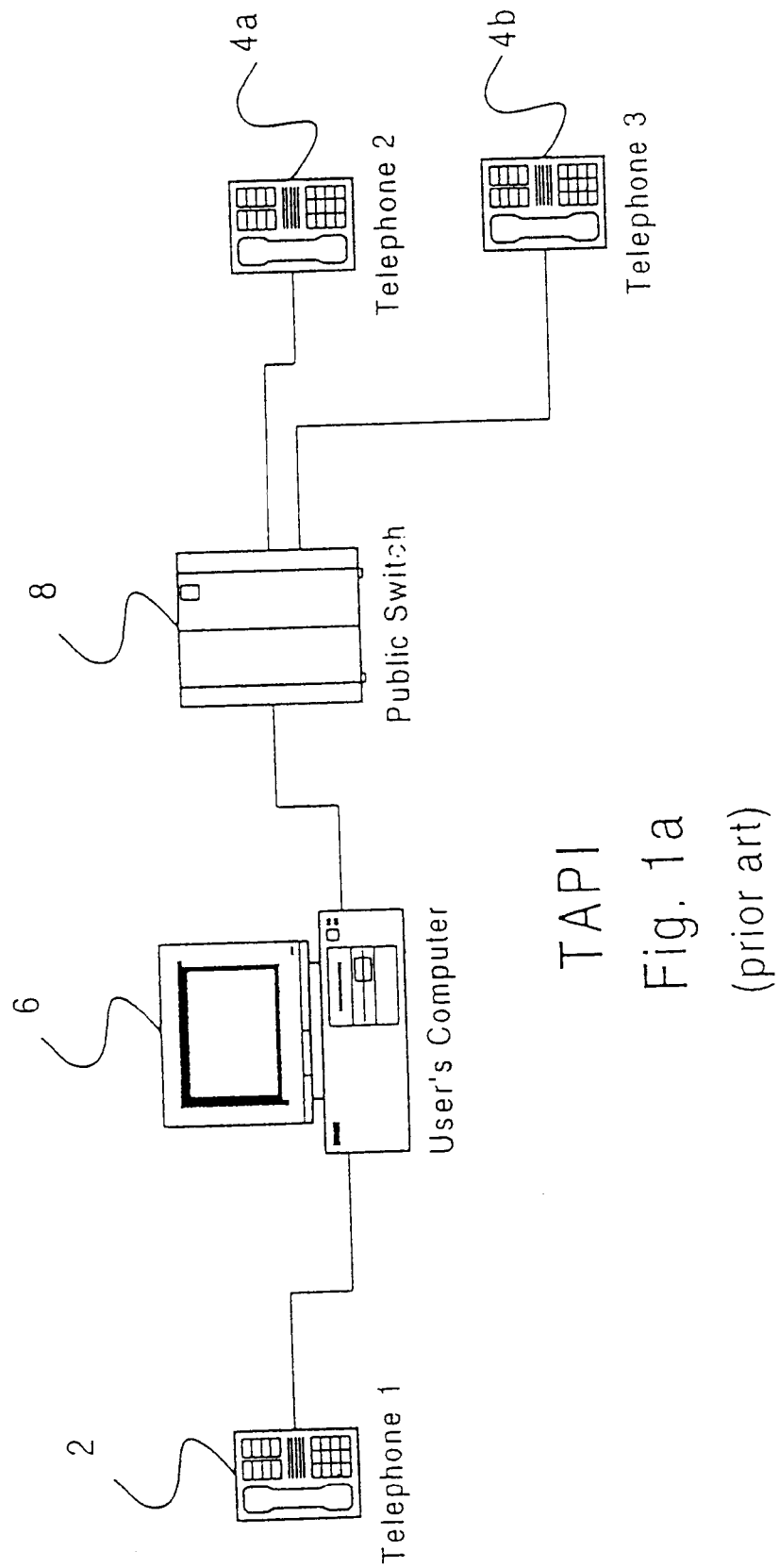

TELECOMMUNICATION MANAGEMENT SYSTEM AND USER INTERFACE

FIELD OF THE INVENTION

The present invention relates generally to a system for managing a telecommunication system, and more particularly to a telecommunications management system on a personal computer with a graphical user interface display.

BACKGROUND OF THE INVENTION

As the number of telecommunications options available increases so does the need for a method of managing those options. The two most significant communication channels are the computer and the telephone. In order to achieve greater efficiency and flexibility attempts have been made to integrate the telephone and the computer.

The earliest method for integrating telephone services and computers (also known as computer telephony integration or CTI) simply used the personal computer as a telephone dialer and address book. The computer stored the names, addresses, and telephone numbers of numerous individuals. A telephone number would be selected and the computer would generate the DTMF tones to place the call (in-band dialing). The user would then pick up a handset once the phone on the other end was ringing or answered.

By the late 1980s mainframe platforms and proprietary communication application programming interfaces were the most common method of computer telephony integration. This resulted in limited solution to the question of how best to integrate telephones and computers as well as numerous hardware and software incompatibilities. With the advent of Microsoft's Telephone Application Programming Interface (TAuPI), illustrated in FIG. 1a, and the Telephony Services Application Programming Interface (TSAPI) from AT&T and Novel, illustrated in FIG. 1b, CTI is becoming a technology for the widespread integration of telephones and computers.

The advent TSAPI and TAPI has increased the number of communication options available to users through the integration of telephone services and computers. Unfortunately, most prior art systems require the user to learn cumbersome and nonintuitive commands in order to utilize the features of the system. There is a need for a telecommunication management system which provide an easy to learn and intuitive interface for powerful TAPI and TSAPI based telecommunication systems.

SUMMARY OF THE INVENTION

The present invention is a system for managing a telecommunication system on a personal computer with a graphical user interface. Through the use of graphical representations of communication channels accessible to the user and individuals with whom to communicate, the system allows the user to manage telecommunications services by manipulating the graphical representations on a display in order to control a TAPI or TSAPI based system.

The present invention uses the Person Identifier as the basic representation of individuals that can be contacted. Person Identifiers, also referred to as PIs, are displayed as PI icons. Each Person Identifier has an associated PI record stored in memory which contains all of the necessary access numbers for the system to contact the individual associated with the particular PI. Voice mail boxes may also be graphically represented and are functional equivalents of PIs. There are also graphical representations for incoming calls (displayed as Incoming Call icons), conference calls (displayed as conference call visual representations), and communication channels (displayed as Call Control Windows). The graphical representations are manipulated on a display in order to use TAPI and TSAPI based features as well as to access information in databases including a Personal Information Manager (PIM) and Call Log.

One aspect of the present invention is the use of a drag and drop interface to allow the user to control the TAPI or TSAPI based telecommunication system. To initiate a telephone call, the calling party uses a cursor to drag a person identifier (PI) icon into the graphical representation of a telephone communication channel (also referred to as the Call Control Window or CCW), usually represented as a window on a desktop computer display. A telephone number associated with the PI icon, stored in the PI record, is then dialed by the system.

If the person placing the call wants to initiate a conference call, he or she drags multiple person identifier icons into the Call Control Window. If there is a need to transfer one of the members of the conference call to another line, the user controlling the conference call drags the PI icon representing the person to be transferred out of the window representing the conference call. If the PI icon is dragged into a second Call Control Window the person associated with the PI icon is transferred to the line represented by the second CCW. Alternatively, if the PI being transferred is dragged onto a second PI icon they will be transferred to a telephone number associated with the second PI icon. The second PI icon may represent a voice mail box. In this fashion, conference calls can be formed and split up into numerous groups simply by rearranging the PI icons in different Call Control Windows representing different communication channels or dragging them onto the PI icon of the person they should be transferred to. It is also possible to transfer more than one member out of a conference call to another line simply by selecting several PI icons as a group and dragging them into another telephone control window representing a different communication channel or a separate PI icon outside of the original telephone control window. Additionally, the user may also drag and drop a selected PI icon or group of PI icons onto a hold icon or disconnect icon.

Another aspect of the present invention is that calls may also be transferred to another individual by dragging a representation of a call out of a Call Control Window that presents incoming calls onto the PI of the person to whom the call is to be transferred. Alternatively, the called party could initiate a call to the party to whom the call is going to be transferred in a second Call Control Window and then conference in the incoming call by dragging it into that second CCW.

Still another aspect of the present invention is that it contains an integrated contact list containing the Person Identifier records which is automatically updated every time a call is placed or received. The contact list can be maintained by any of numerous Personal Information Managers (PIMs). The call log database can also be used to maintain the contact list. Each record in the contact list has a Person Identifier icon associated with it that can be used to initiate a telecommunication function by dragging PIs out of the contact list and into a Call Control Window.

The present invention uses Automatic Number Identification (ANI also known as Caller ID) to identify outside callers and information from the telephone system to identify internal callers. Upon receipt of an incoming call, the system searches the contact list for a matching record and displays the record before the call is answered.

The system logs all incoming and outgoing calls and maintains a user accessible record of calling activity which may be broken down chronologically or by individual. Incoming and outgoing calls are displayed in the call log graphical representation. Incoming calls are also displayed as an Incoming Call (IC) icon in the Call Control Window associated with the line to which their call is directed. In systems in which there is only one Call Control Window, the incoming calls can be displayed in the order they were received. The system may also provide different types of incoming calls with different types of incoming call icons (internal, local, long distance, toll free, preferred customer, etc.)

Still another aspect of the present invention is the ability to control the use of different communication options (also referred to as access methods) with the same type of graphical manipulation. Person Identifier icons can be used to access all of the access numbers which are associated with the person in a memory called a PI record. One access number will be the default number such as an office phone number or a cell phone number. However, the present invention allows the user to select alternate access methods using simple graphical manipulation. Dragging a PI onto a representation of another type of access method will cause the system to attempt to contact the party through that type of access method. Dragging a PI icon on to the representation of an access method such as a pager will cause that person to be paged and will bring up a window requesting the pager number if one is not already associated with that access method within the PI record and will ask for the text to be transmitted if it is a display pager. The user can easily select office, home, fax, mobile, or pager access methods quickly and easily. A different Call Control Window may be provided for each access method or an option window may be clicked to select the access method to be used with a single CCW. Alternatively, a graphical button or key may be used to specify the access method to be used). The method for contacting the individual associated with the PI can be selected by actuating a graphical button before the PI icon is dragged into the call control window. The present invention also allows the user to specify which of these methods is the default to be dialed when the PI is dragged into the call control window.

These and other features of the present invention will be more fully appreciated when considered in light of the following detailed description and drawings.

BRIEF DESCRIPTION OF THE DRAWINGS

FIG. 1a is a functional diagram of a prior art TAPI based telephone system.

DETAILED DESCRIPTION OF THE INVENTION

Figure 1B:
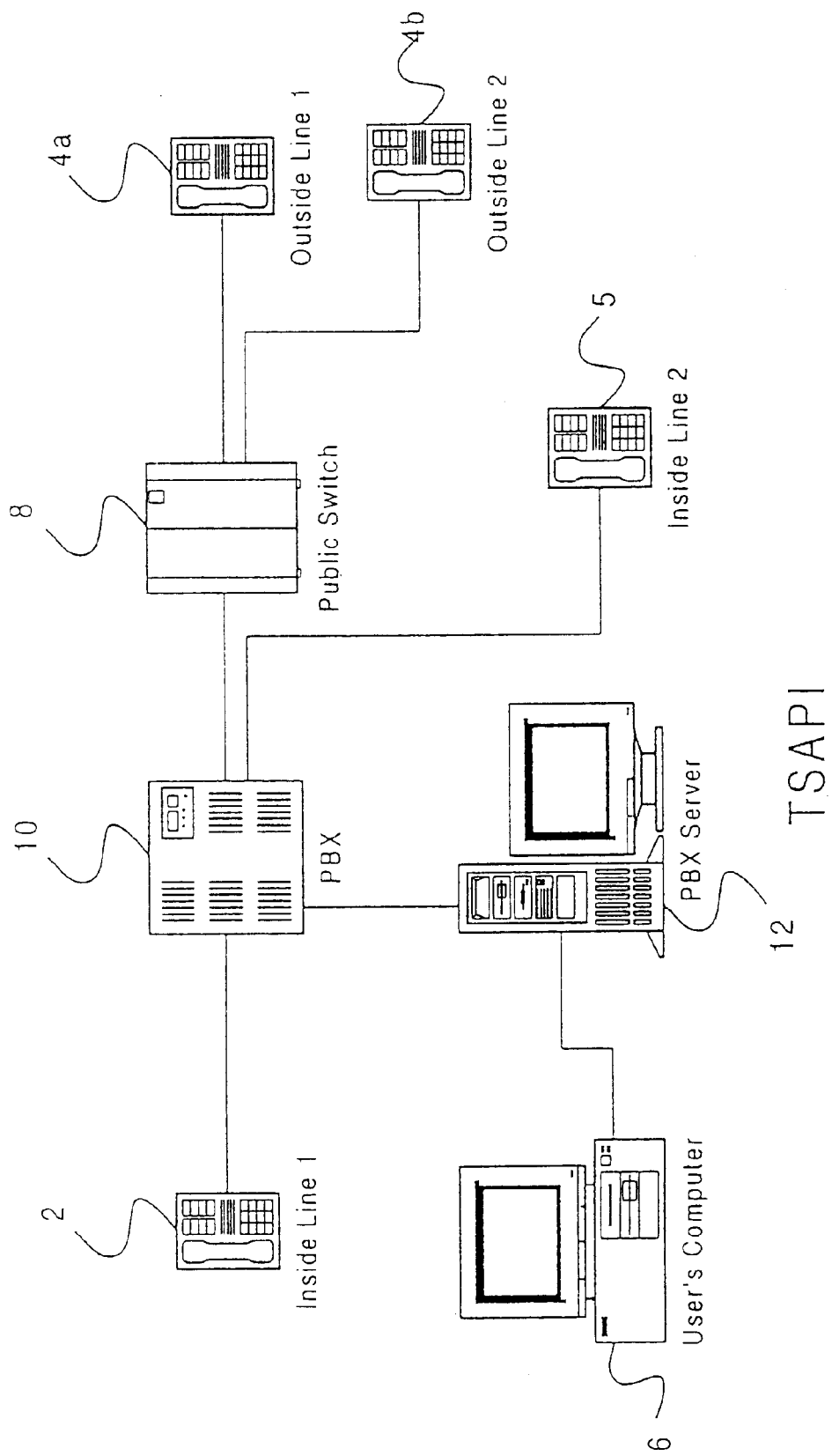
FIG. 1b is a functional diagram of a prior art TSAPI based telephone system.

TAPI, see FIG. 1a, is a method for integrating telephone services and computers so as to allow a computer to control a user's telephone 2 (dialing the telephone, transferring calls, etc.) and receive caller ID information into the user's computer 6 allowing information about the calling party to be displayed before the phone is answered. TAPI is a desktop-centric method, in which a desktop PC is directly connected to the telephone on the desktop 2 and the public switch 8. The public switch 8 connects the user's telephone to another telephone 4. TAPI includes the specification for the physical link between a telephone and its controlling computer, typically the telephone user's desktop PC 6. The emphasis is on first-party control, whoever is connected to the call controls the call. Once a call is transferred, the transferring party loses control of the call.

TSAPI, see FIG. 1b, is another method for integrating telephone services and computers and is based on third party control, that is calls can be tracked as they are transferred. With TSAPI, first-party type control is performed from the Private Branch Exchange(PBX) 10 not the user's telephone 2 as in TAPI connected to the desktop computer 6. To place a call, the PBX 10 dials the telephone number, through the public switch 8 if it is to an outside telephone 4 or directly if it is to an inside telephone 5, and then transfers the call to the called telephone 12. TSAPI specifies the physical link between a PBX server 12 and a PBX 10. TSAPI allows the computer to instruct the PBX 10 to place outgoing calls, send calls to a particular telephone, hold calls, conference calls, report the status of calls, and other typical PBX functions.

Figure 2A:
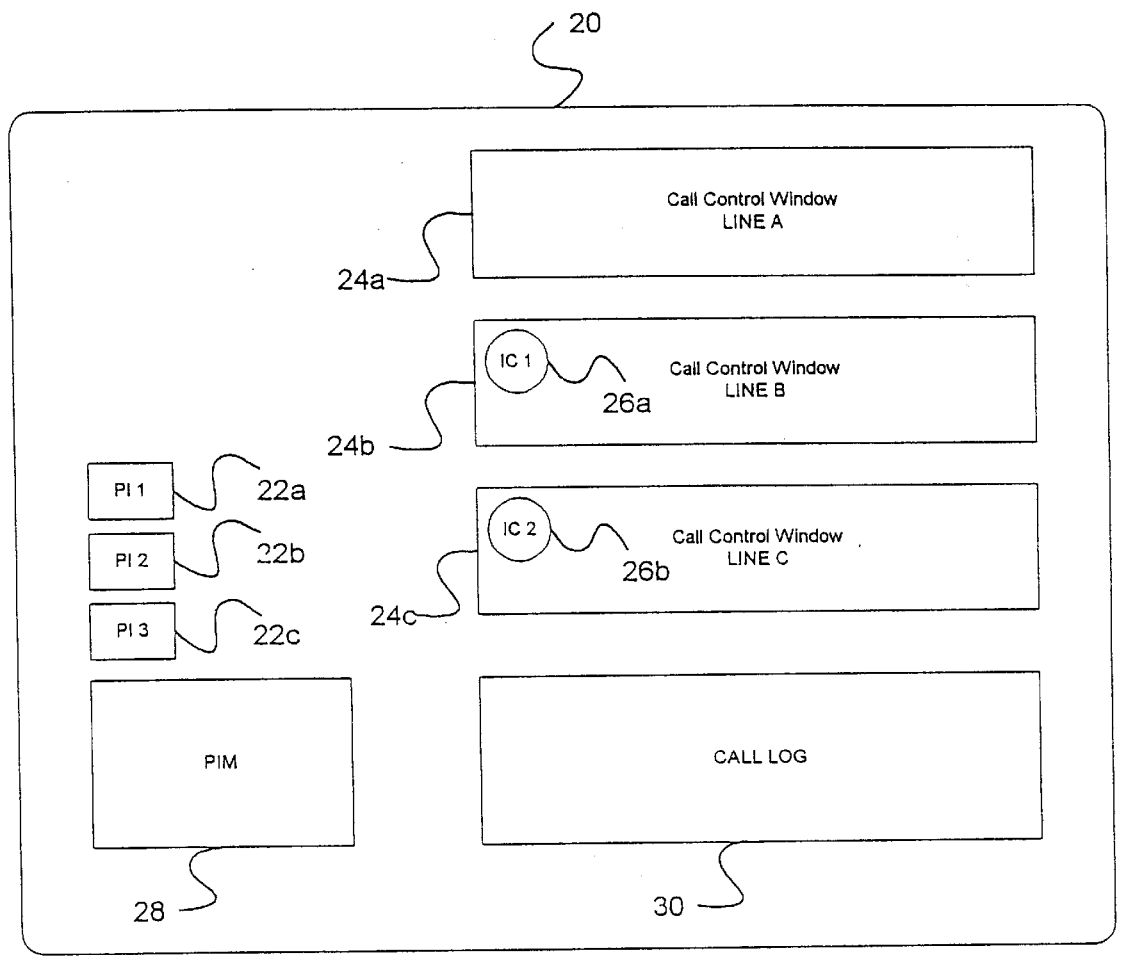
FIG. 2a is the display of the present invention.

FIG. 2a illustrates a typical implementation of the present invention showing a display 20 having several person identifier icons 22a, 22b, and 22c and a series of call control windows (also referred to as communication line visual representations) 24a, 24b, and 24c. Incoming calls are represented by incoming call icons 26a and 26b in the call control windows 24b and 24c respectively. Individual call control windows may represent specific telephone lines or they may be representations of different types of telephone lines.

In a system where each call control window 24 represents a specific telephone line, call control window 24b is associated with and represents telephone line B and call control window 24c is associated with and represents telephone line C. When there is an incoming call on line B it will appear as an incoming call icon 26a in call control window 24b. Likewise, an incoming call on line C will be represented by incoming call icon 26b in call control window 24c.

The graphical user interface (GUI) of the present invention is generated in Microsoft Windows 3.11, Windows 95, and Windows NT using well known methods for displaying windows and icons on a computer display as part of the respective operating systems.

Each Person Identifier icon 22 has a person identifier record associated with it. The person identifier record contains a default telephone number that is to be used unless another number is specified. One method for selecting an alternative telephone number is to provide the user with a pull down menu listing the telephone numbers associated with the person identifier when the associated person identifier icon is selected and a specified key is activated (left clicking the mouse, space bar, F1 key, etc.).

The personal information management database and the call log database are also given graphical representations 28 and 30 on the display 20. This allows the PIM and call log to be manipulated graphically in the same manner as the rest of the telecommunication management system. Every outgoing and incoming call generates a record which is stored in the call log database. This record contains information about the telephone call including date, time, telephone number, and the caller/callee's name, if available. If a person identifier does not exist for the caller/callee, the system may generate a person identifier record based upon the information in the call log database.

Figure 3:
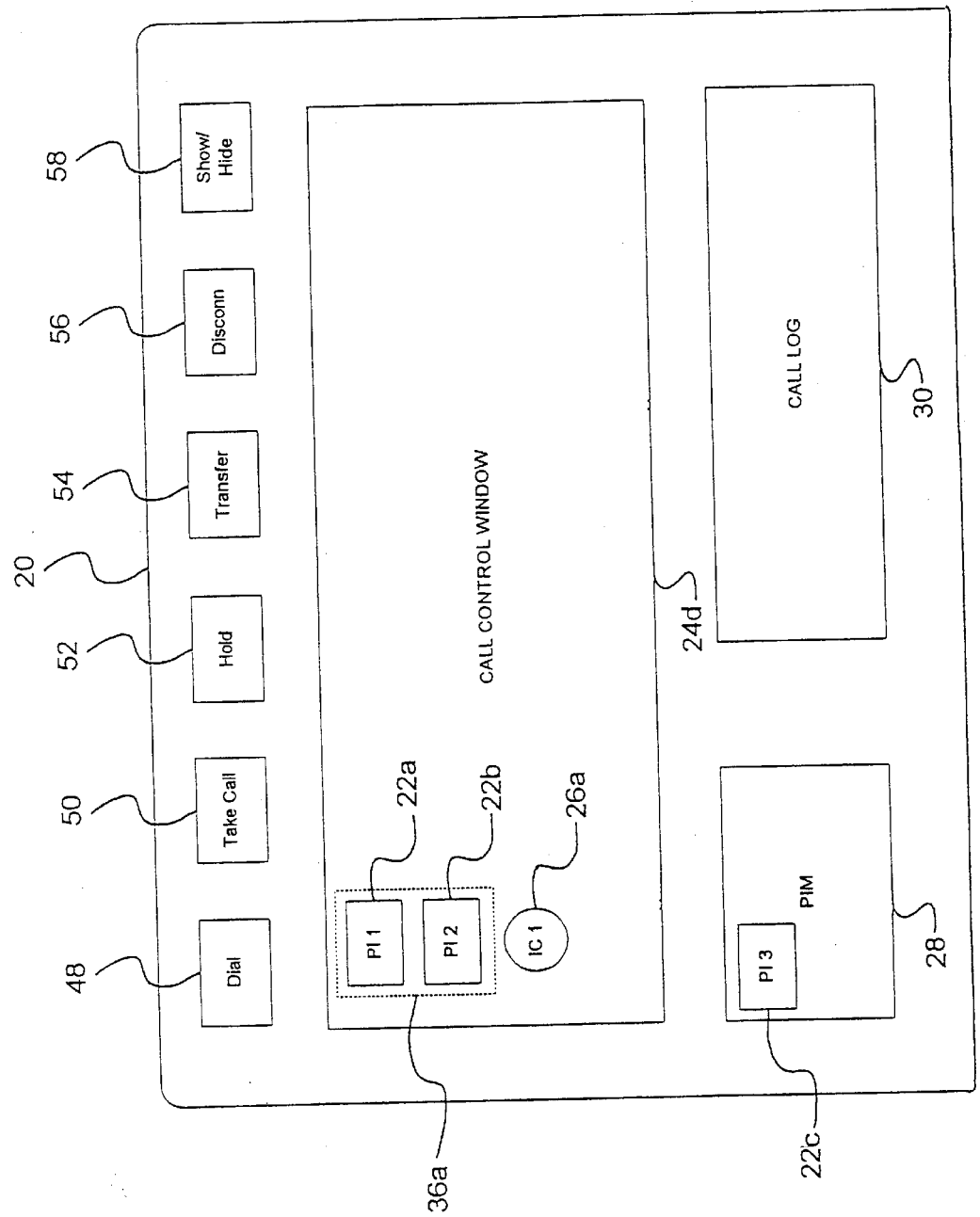
FIG. 3 is the display of the present invention.

Incoming call icons 26 are generated whenever incoming telephone calls are received by the system and directed to the telephone 2 associated with the user's computer 6. If the call control windows 24 represent specific lines or types of lines, then the incoming call icons 26 will appear in the window 24 associated with the telephone line or type of line on which the call was received. If the call control windows 24 are not associated with specific lines then the calls will appear in the call control windows in the order in which they are received. If there is only one call control window 24, as illustrated in FIG. 3, then the calls can be presented in a user specified list format.

If automatic number identification is available, then the system will display the telephone number as well as any information that may be associated with that telephone number either in the personal information manager database, a person identifier record or a secondary database of telephone numbers. If there is a name associated with the incoming telephone call's phone number in an available database, then the name is displayed along side the incoming call icon display in addition to or in place of the phone number. The user may also edit the name associated with an incoming phone number. If the phone number is not available through automatic number identification (ANI) or from the PBX, then the system will display a message that no information is available.

The call log data base window 30 keeps track of all telephone calls either initiated or received by the telephone line or lines associated with the call control windows 24a, 24b and 24c. FIG. 2a, shows a first incoming call icon 26a displayed in call control window 24b which is associated with telephone line A and a second incoming call icon 26b displayed in call control window 24c which is associated with telephone line B.

Figure 2B:
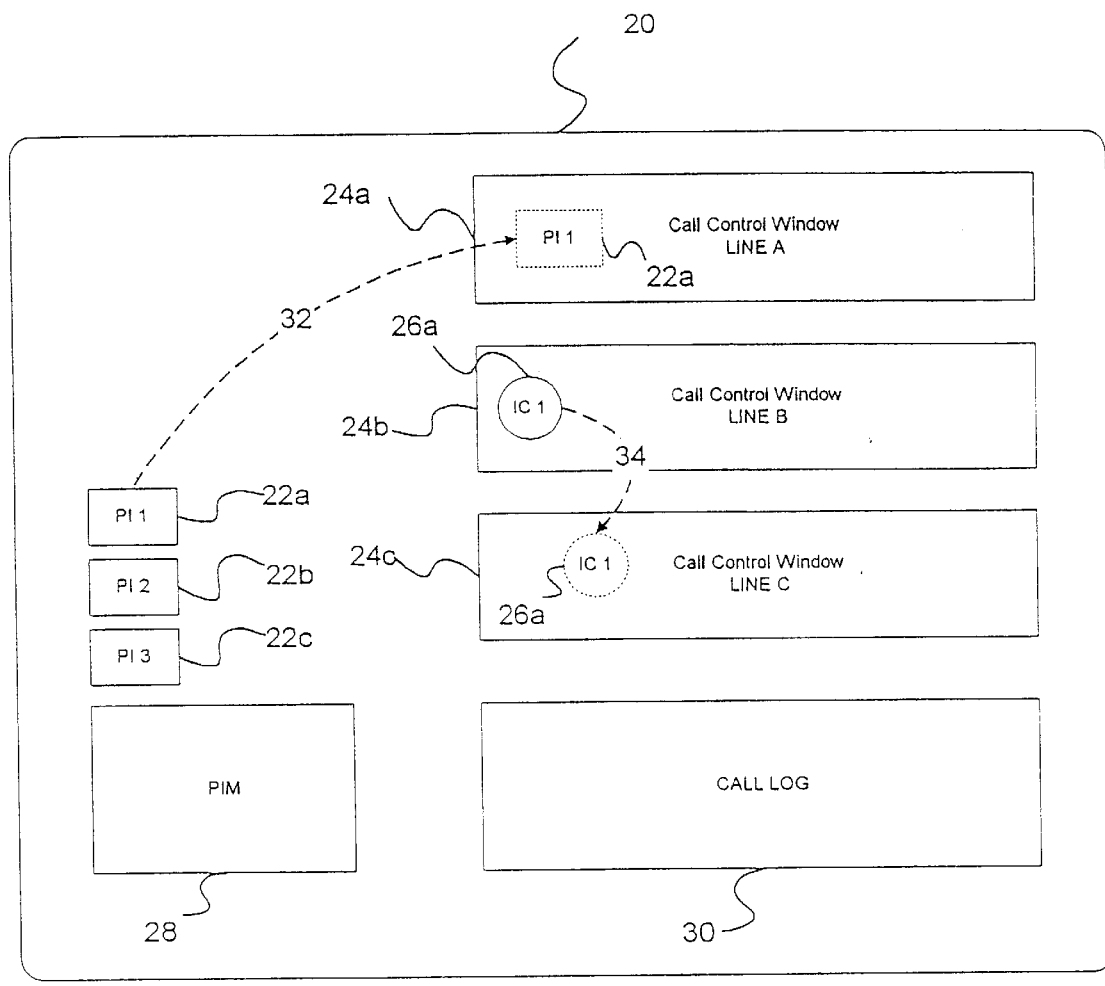
FIG. 2b is the display of the present invention.

FIG. 2b illustrates the method of drag and drop dialing and shows the drag route 32. In drag and drop dialing, a PI icon 22a is selected with a cursor and is dragged graphically across the screen display 20 into call control window 24a. Upon release of the PI icon in call control window 24a, the system dials the default telephone number associated with person identifier icon 22a on the telephone line associated with the control window 24a.

Transferring a call from one call control window to another call control window is illustrated by drag route 34. FIG. 2b illustrates a method by which an incoming call on telephone line B, which is associated with and represented by call control window 24b, can be connected to another party on line C, which is associated with and represented by call control window 24c. In call control window to call control window transferring, the incoming call icon 26a is dragged from call control window 24b and dropped into call control window 24c. This causes the system to connect the incoming call on telephone line B to another party (not shown) who is already connected on telephone line C.

Figure 2C:
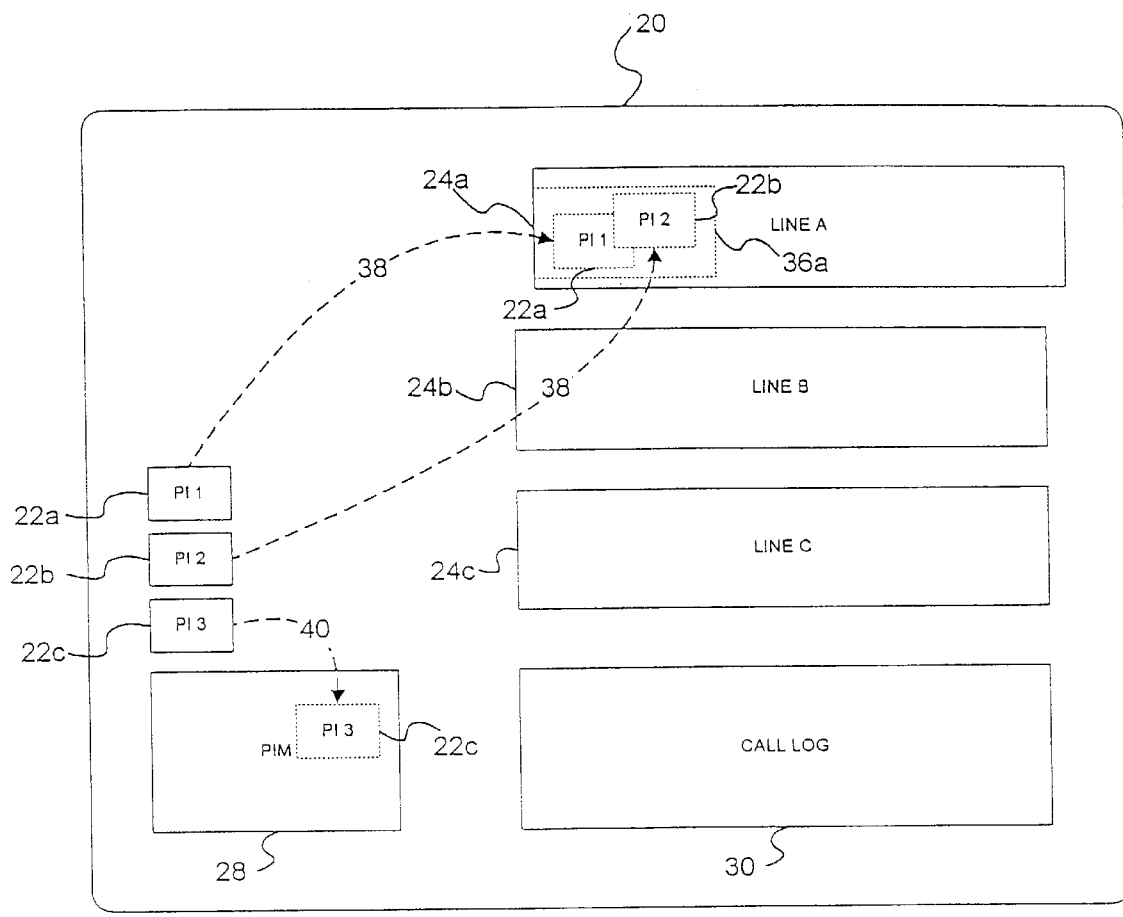
FIG. 2c is the display of the present invention.

FIG. 2c, illustrates the method of drag and drop conference calling in the present invention illustrated by drag routes 38. In drag and drop conference calling, a first person identifier icon 22a and a second person identifier icon 22b are dragged into a call control window 24a. The system dials the telephone numbers associated with the person identifier icons and conferences them together with the user. Once the conference call is initiated, a conference call visual representation 36a is generated.

FIG. 2c also illustrates transferring person identifier information into the personal information management database by dragging and dropping the person identifier icon 22c onto the personal information database visual representation 28. This causes the system to copy information associated with person identifier icon 22c to the PIM database.

Figure 2D:
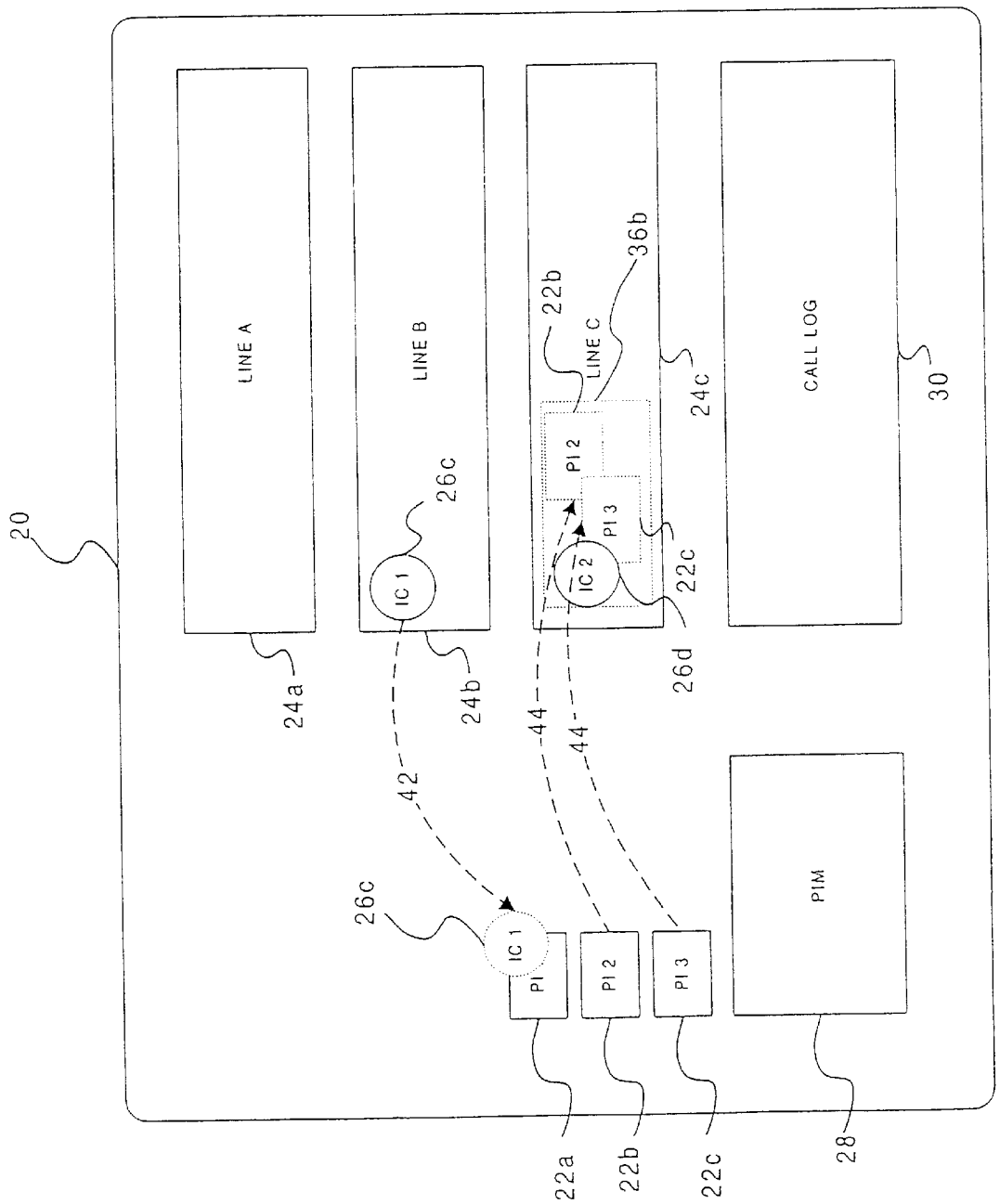
FIG. 2d is the display of the present invention.

FIG. 2d illustrates incoming call to person identifier transferring as shown by drag route 42. Incoming call to person identifier icon transferring is accomplished by dragging an incoming call icon 26c from call control window 24b and dropping the incoming call icon 26c onto a person identifier icon 22a. This transfers or forwards the telephone call associated with the incoming call icon to the default telephone number associated with person identifier icon 22a.

FIG. 2d also illustrates conferencing by dragging person identifiers 22b and 22c along drag routes 44 into call control window 24c where incoming call icon 26d is already displayed. This causes a conference call to be generated involving the user, incoming call 26d and person identifiers 22b and 22c. Once the conference call is generated, a conference call visual representation 36b is displayed.

Figure 2E:
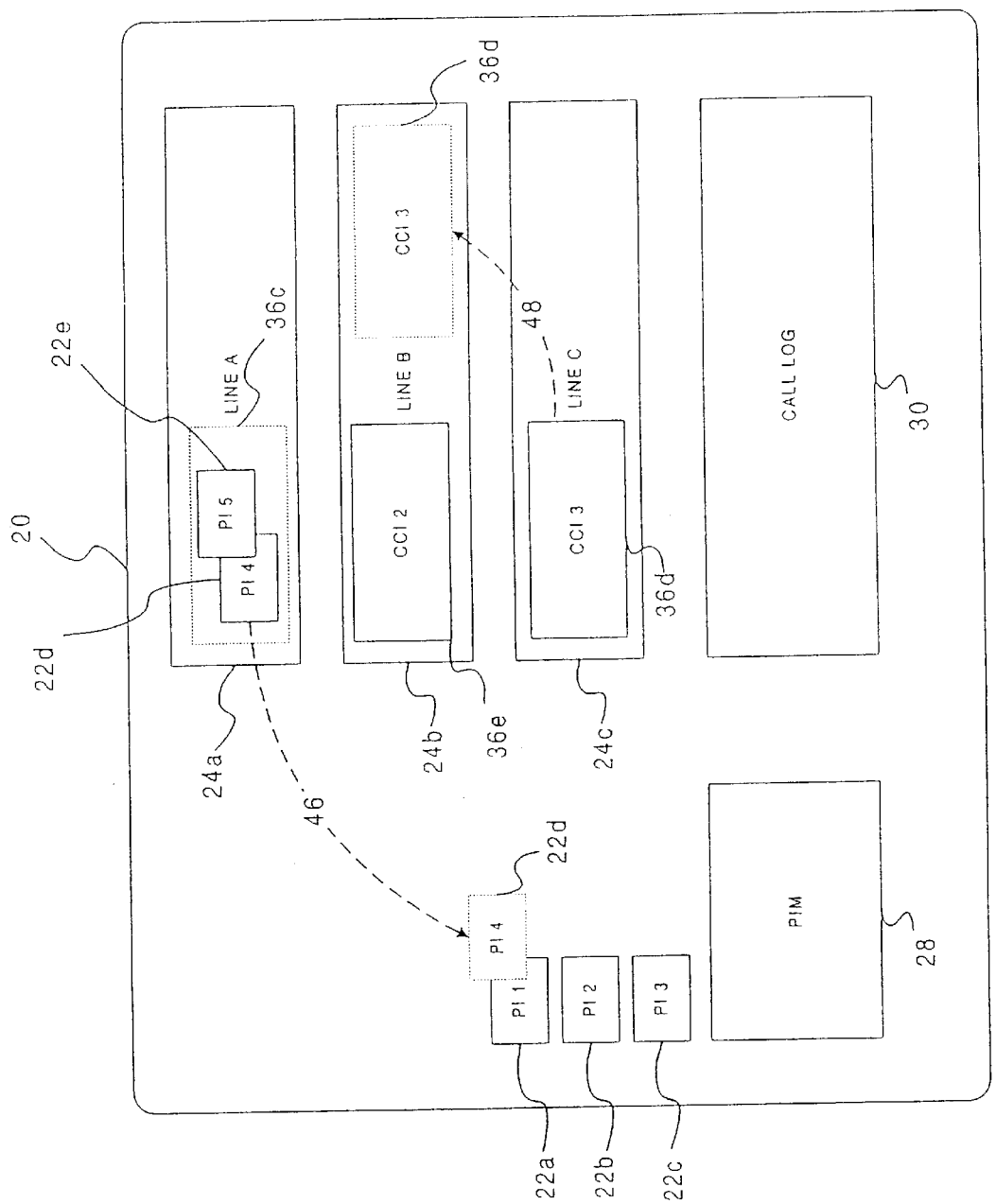
FIG. 2e is the display of the present invention.

FIG. 2e illustrates with drag route 46 the process of transferring someone out of a conference call. This is accomplished by dragging a person identifier 22d out of a conference call visual representation 36c. If the person identifier icon 22d is dragged on top of another person identifier icon 22a and then dropped, the person associated with icon 22d will have their call transferred to the default telephone number associated with person identifier icon 22a. If the person identifier is dragged out of the conference call but not dropped into a call control window or onto a person identifier icon, the system may be configured to either place the party associated with the person identifier 22d on hold or disconnect them.

FIG. 2e also illustrates with drag route 48 the process of conference call merging. Conference call merging is accomplished by dragging a conference call visual representation 36d from one call control window 24c and dropping it into another call control window 24b where a conference call visual representation 36e is already active, which merges the two conference calls together.

FIG. 3 illustrates a preferred embodiment of the present invention. Display 20 has a centrally located call control window 24d, a personal information manager graphical representation 28, a graphical representation of a call log database 30, as well as a number of buttons displayed along the top of the display. The buttons include a dial button 48, a take call button 50, a hold button 52, a transfer button 54, a disconnect button 56, and a show/hide button 58. All of the methods illustrated in the previous embodiments of the invention are performed exactly the same way in the embodiment illustrated in FIG. 3. However, instead of having multiple call control windows, each associated with a specific telephone line, this embodiment utilizes a single call control window and does not indicate which telephone line a call is coming in on or going out on by means of different call control windows. The line a call is coming in on or going out on can be illustrated by varying the person identifier icons 22 or the incoming call icons 26. The buttons provided along the top of the display provide the user with an alternative method for controlling the telecommunications system.

From the foregoing teachings, it can be appreciated by one skilled in the art that a new, novel, and nonobvious telecommunication management system has been disclosed. It is to be understood that numerous alternatives and equivalents will be apparent to those of ordinary skill in the art, given the teachings herein, such that the present invention is not to be limited by the foregoing description but only by the appended claims.

We claim:

1. A method for a communications management system including a display to place a call to a party to be called, comprising:
   a) displaying on said display a person identifier icon providing access to multiple telephone numbers stored in a memory;
   b) displaying on said display a first communication control visual representation;
   c) receiving user input in the form of directing a cursor on said display and actuating a key, which user input:
      i) specifies said person identifier icon by placing said cursor on said person identifier icon and actuating said key,
      ii) specifies said first communication control visual representation by placing said cursor on said first communication control visual representation and actuating said key, and
      iii) specifies an association between said first communication control visual representation and said person identifier icon by, after receiving a specification of said person identifier icon, causing said person identifier icon to follow the cursor as it is moved to said first communication control visual representation; and
   d) placing a call to one of said multiple telephone numbers accessible via said person identifier icon.

2. The method of claim 1 wherein the communications management system has access to a plurality of communications lines, further comprising:
   a) displaying on said display a second communication control visual representation at the same time that said first communication control visual representation is displayed on said display.
   b) receiving user input in the form of directing a cursor on said display and actuating a key, which user input specifies an association between said second communication control visual representation and said person identifier icon; and
   c) connecting said call placed on a first communication line associated with said first communication control visual representation to a second communication line associated with said second communication control visual representation.

3. The method of claim 1 wherein the communications management system further comprises:
   (a) displaying on said display a hold function icon;
   (b) receiving user input in the form of directing a cursor on said display and actuating a key, which user input specifies an association between said hold function icon and said person identifier icon; and
   (c) placing the telephone number associated with said person identifier on hold.

4. The method of claim 1 wherein one of the multiple telephone numbers associated with said person identifier icon is a default phone number.

5. The method of claim 1 wherein the communications management system further comprises:
   receiving user input in the form of directing a cursor on said display and actuating a key, which user input specifies said person identifier icon and selects one of said multiple telephone numbers associated with said person identifier icon.

6. The method of claim 1 wherein the communications management system has access to a plurality of communications lines, further comprising:
   a) displaying on said display a second communication control visual representation at the same time that said first communication control visual representation is displayed on said display, wherein said second communication control visual representation is displayed in a format which does not overlap with said first communication control visual representation;
   b) receiving user input in the form of directing a cursor on said display and actuating a key, which user input specifies an association between said second communication control visual representation and said person identifier icon; and
   c) connecting said call placed on a first communication line associated with said first communication control visual representation to a second communication line associated with said second communication control visual representation.

7. A method for a communications management system including a display to copy a record to a database, comprising:
   a) receiving input specifying a name and telephone number from the telephone network the first time an incoming call is received from that telephone number;
   b) storing said name and telephone number in data fields in said record;
   c) displaying on said display a person identifier icon associated with said record;
   d) displaying a database visual representation associated with said database;
   e) receiving user input in the form of directing a cursor and actuating a key which input specifies an association between the person identifier icon and the database visual representation; and
   f) copying said name and telephone number to said database.

8. A method for a communications management system including a display for a user to place a conference call to multiple parties, comprising:
   a) displaying on said display a first person identifier icon associated with a first telephone number for a first party;
   b) displaying on said display a second person identifier icon associated with a second telephone number for a second party;
   c) displaying on said display a first communication control visual representation;
   d) receiving user input in the form of directing a cursor on said display to said first person identifier icon, directing said cursor on said display to said second person identifier icon and actuating a key which specifies an association between said first person identifier icon, said second person identifier icon, and said first communication control visual representation; and
   e) establishing a first conference call by dialing said first telephone number on a first communications line, dialing said second telephone on a second communications line and connecting both lines to a telephone for the user;
   f) displaying a first conference call visual representation associated with said first conference call;

g) displaying on said display a second conference call visual representation associated with a second conference call on a third communications line and a fourth communications line;

h) receiving user input in the form of directing said cursor on said display and actuating said key which input associates said second conference call visual representation with said first conference call visual representation; and i) establishing a merged conference call by connecting said first communications line, said second communications line, said third communications line and said fourth communications line.

9. The method of claim 8 wherein said association is specified by causing said first person identifier icon to follow the cursor as it is moved onto said first communication control visual representation and causing said second person identifier icon to follow the cursor as it is moved onto said first person identifier icon.

10. The method of claim 8 wherein said association is specified by causing said first person identifier icon to follow the cursor as it is moved onto said first communication control visual representation and causing said second person identifier icon to follow the cursor as it is moved onto said first communication control visual representation.

11. The method of claim 8 wherein said first conference call visual representation is displayed within said first communication control visual representation.

12. A method for transferring a call in a communications management system including a display, comprising:

a) connecting a telephone call;

b) displaying on said display a call icon associated with said telephone call;

c) displaying on said display a person identifier icon;

d) receiving user input in the form of selecting said telephone call icon and associating it with said person identifier icon; and e) transferring said incoming telephone call to a communications line associated with said person identifier icon.

13. The method of claim 12 wherein the communications line associated with said person identifier icon connects to a voice mail box.

14. The method of claim 12 wherein transferring said incoming telephone call to said communications line places the call on hold.

15. A device for a communications management system including a display to place a call to a party to be called, comprising:

a) means for displaying on said display a person identifier icon providing access to multiple telephone numbers stored in a memory;

b) means for displaying on said display a first communications control visual representation;

c) means for receiving user input in the form of directing a cursor on said display and actuating a key, which user input:

i) specifies said person identifier icon by placing said cursor on said person identifier icon and actuating said key, ii) specifies said first communication control visual representation by placing said cursor on said first communication control visual representation and actuating said key, iii) specifies an association between said first communication control visual representation and said person identifier icon, d) means for causing said person identifier icon to follow the cursor as it is moved to said first communication control visual representation; and means for placing a call to one of said telephone numbers accessible via said person identifier icon.

16. The device of claim 15 wherein the communications management system has access to a plurality of communications lines, further comprising:

a) means for displaying on said display a second communication control visual representation at the same time that said first communication control visual representation is displayed on said display;

b) means for receiving user input in the form of directing a cursor on said display and actuating a key, which user input specifies an association between said second communication control visual representation and said person identifier icon; and c) means for connecting said call placed on a first communications line associated with said first communication control visual representation to a second communication line associated with said second communication control visual representation.

17. The device of claim 15 wherein the communications management system further comprises:

a) means for displaying on said display a hold function icon;

b) means for receiving user input in the form of directing a cursor on said display and actuating a key, which user input specifies an association between said hold function icon and said person identifier icon; and c) means for placing the telephone number associated with said person identifier on hold.

18. The device of claim 15 wherein one of the multiple telephone numbers associated with said person identifier icon is a default phone number.

19. The device of claim 15 wherein the communications management system further comprises:

means for receiving user input in the form of directing a cursor on said display and actuating a key, which user input specifies said person identifier icon and selects one of said multiple telephone numbers associated with said person identifier icon.

20. The device of claim 15 wherein the communications management system has access to a plurality of communications lines, further comprising:

a) means for displaying on said display a second communication control visual representation at the same time that said first communication control visual representation is displayed on said display, wherein the second communication control visual representation is displayed in a format which does not overlap with the first communication control visual representation;

b) means for receiving user input in the form of directing a cursor on said display and actuating a key, which user input specifies an association between said second communication control visual representation and said person identifier icon; and c) means for connecting said call placed on a first communications line associated with said first communication control visual representation to a second communication line associated with said second communication control visual representation.

21. A device for a communications management system including a display to copy a record to a database, comprising:

a) means for receiving input specifying a name and telephone number from the telephone network the first time an incoming call is received from that telephone number;

b) means for storing said name and telephone number in data fields in said record;

c) means for displaying on said display a person identifier icon associated with said record;

d) means for displaying a database visual representation associated with said database;

e) means for receiving user input in the form of directing a cursor and actuating a key which input specifies an association between the person identifier icon and the database visual representation; and f) means for copying said name and telephone number to said database.

22. A device for a communications management system including a display for a user to place a conference call to multiple parties, comprising:

a) means for displaying on said display a first person identifier icon associated with a first telephone number for a first party;

b) means for displaying on said display a second person identifier icon associated with a second telephone number for a second party;

c) means for displaying on said display a first communication control visual representation;

d) means for receiving user input in the form of directing a cursor on said display to said first person identifier icon, directing the cursor on said display to said second person identifier icon, and actuating a key which specifies an association between said first person identifier icon, said second person identifier icon, and said first communication control visual representation; and e) means for establishing a first conference call by dialing said first telephone number on a first communications line, dialing said second telephone number on a second communications line and connecting both lines to a telephone for the user;

f) means for displaying a first conference call visual representation associated with said first conference call;

g) means for displaying on said display a second conference call visual representation associated with a second conference call on a third communications line and a fourth communications line;

h) means for receiving user input in the form of directing a cursor on said display and actuating a key which input associates said second conference call visual representation with said first conference call visual representation; and i) means for establishing a merged conference call by connecting said first communications line, said second communications line, said third communications line and said fourth communications line.

23. The device of claim 22 wherein said association is specified by causing said first person identifier icon to follow the cursor as it is moved onto said first communication control visual representation and causing said second person identifier icon to follow the cursor as it is moved onto said first person identifier icon.

24. The device of claim 22 wherein said association is specified by causing said first person identifier icon to follow the cursor as it is moved onto said first communication control visual representation and causing said second person identifier icon to follow the cursor as it is moved onto said first communication control visual representation.

25. The device of claim 22 wherein said first conference call visual representation is displayed within said first communication control visual representation.

26. A device for transferring a call in a communication management system including a display, comprising:

a) means for connecting a telephone call;

b) means for displaying on said display a call icon associated with said telephone call;

c) means for displaying on said display a person identifier icon;

d) means for receiving user input in the form of selecting said telephone call icon and associating it with said person identifier icon; and e) means for transferring said incoming telephone call to a communications line associated with said person identifier icon.

27. The device of claim 26 wherein the communications line associated with said person identifier icon connects to a voice mail box.

28. The device of claim 26 wherein transferring said incoming telephone call to said communications line places the call on hold.

29. A method in a communications system for allowing a user to place an outgoing call on a selected one of several outgoing communications lines, comprising:

a) presenting to the user on a display screen a plurality of communications line visual representations, each representing an outgoing communications line, and an address visual representation, representing an address in the communications system to which a call may be placed, and b) receiving from the user an instruction to place a call to said address on a selected one of said communications lines in the form of an indication from the user to the communications system of an association between said address visual representation and a selected one of said communications lines visual representations wherein the indication comprises receiving successive commands from the user to;

c) place a visual cursor on the address visual representation, drag the address visual representation with the cursor, d) move the cursor to overlay one of the communications line visual representations, and e) drop the address visual representation.

30. A communications system which allows a user to place an outgoing call on a selected one of several outgoing communications lines, comprising:

a) means for presenting to the user on a display screen a plurality of communications line visual representations, each representing an outgoing communications line, and an address visual representation, representing an address in the communications system to which a call may be placed, and b) means for receiving from the user an instruction to place a call to said address on a selected one of said communications lines in the form of an indication from the user to the communications system of an association between said address visual representation and a selected one of said communications lines visual representations comprising means for receiving successive commands from the user to;

c) place a visual cursor on the address visual representation, d) drag the address visual representation with the cursor, e) move the cursor to overlay one of the communications line visual representations, and f) drop the address visual representation over the selected communications line visual representation.

31. A method in a communications system for allowing a user to place an outgoing call to a party to be called having a plurality of access methods for reaching the called party, comprising:

a) presenting to the user on a display a person identifier visual representation associated with the party to be called and a plurality of access method visual representations, each associated with one of said plurality of access methods, and b) receiving from the user an instruction to place a call to said party to be called via one of said access methods in the form of an indication from the user to the communications system of an association between said person identifier visual representation and a selected one of said access method visual representations.

32. The method of claim 31 where the plurality of access methods for reaching the called party include calling the party at one or more of an office communications device location, a home communications device location, a mobile communications device location, or a pager communications device location.

33. The method of claim 32 wherein the indication from the user to the communications system comprises receiving successive commands from the user to:

a) place a visual cursor on the person identifier visual representation, b) drag the person identifier visual representation with the cursor, c) move the cursor to overlay one of the access method visual representations, and d) drop the address visual representation.

34. The method of claim 31 wherein the indication from the user to the communications system comprises receiving successive commands from the user to:

a) place a visual cursor on the person identifier visual representation, b) drag the person identifier visual representation with the cursor, c) move the cursor to overlay one of the access method visual representations, and d) drop the person identifier visual representation.

35. A communications system allowing a user to place an outgoing call to a party to be called having a plurality of access methods for reaching the called party, comprising:

a) means for presenting to the user on a display a person identifier visual representation associated with the party to be called and a plurality of access method visual representations, each associated with one of said plurality of access methods, and b) means for receiving from the user an instruction to place a call to said party to be called via one of said access methods in the form of an indication from the user to the communications system of an association between said person identifier visual representation and a selected one of said access method visual representations.

36. The communications system of claim 35 where, to implement the plurality of access methods for reaching the called party, the system includes means for calling the party at one or more of an office communications device location, a home communications device location, a mobile communications device location, or a pager communications device location.

37. The communications system of claim 36 wherein the means for receiving an indication from the user to the communications system comprises means for receiving successive commands from the user to:

a) place a visual cursor on the person identifier visual representation, b) drag the person identifier visual representation with the cursor, c) move the cursor to overlay one of the access method visual representations, and d) drop the address visual representation.

38. The communications system of claim 35 wherein the means for receiving an indication from the user to the communications system comprises means for receiving successive commands from the user to:

a) place a visual cursor on the person identifier visual representation, b) drag the person identifier visual representation with the cursor, c) move the cursor to overlay one of the access method visual representations, and d) drop the person identifier visual representation.

* * * * *